Nov. 3, 1931.    R. R. SCHMIDT    1,830,373
REVOLVING TRUCK LOADING STRUCTURE
Filed Feb. 6, 1929    2 Sheets-Sheet 1
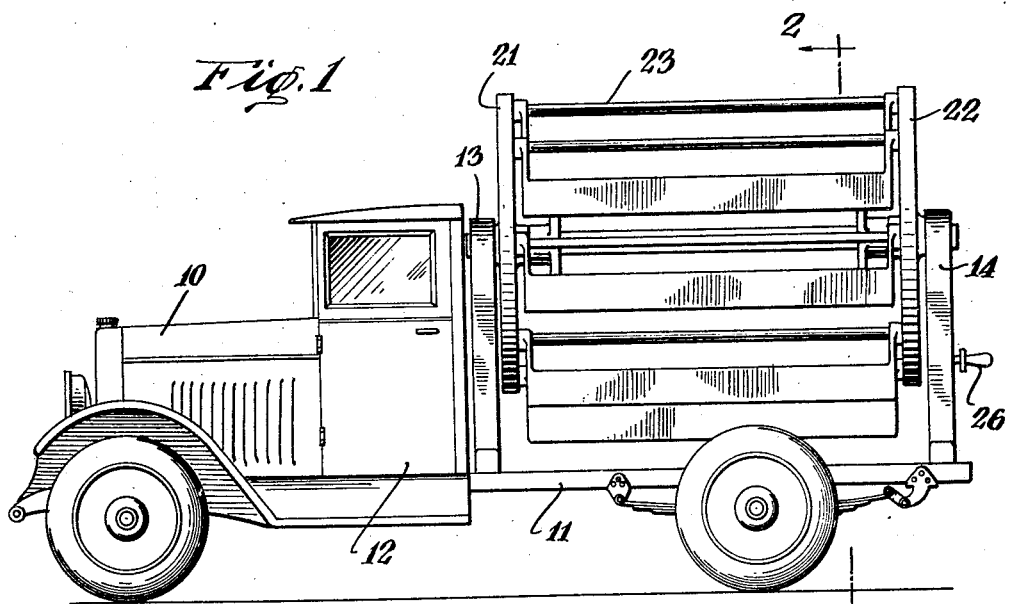
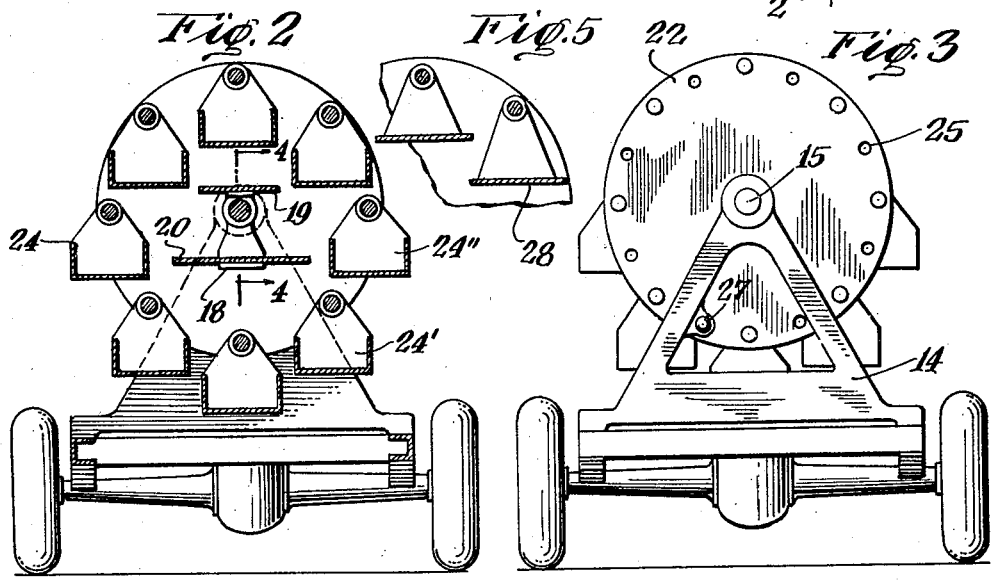
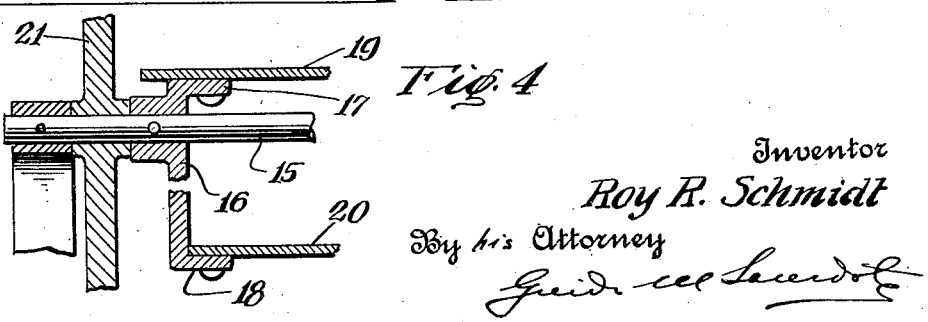
Inventor
Roy R. Schmidt
By his Attorney Nov. 3, 1931.  R. R. SCHMIDT  1,830,373
REVOLVING TRUCK LOADING STRUCTURE
Filed Feb. 6, 1929  2 Sheets-Sheet 2
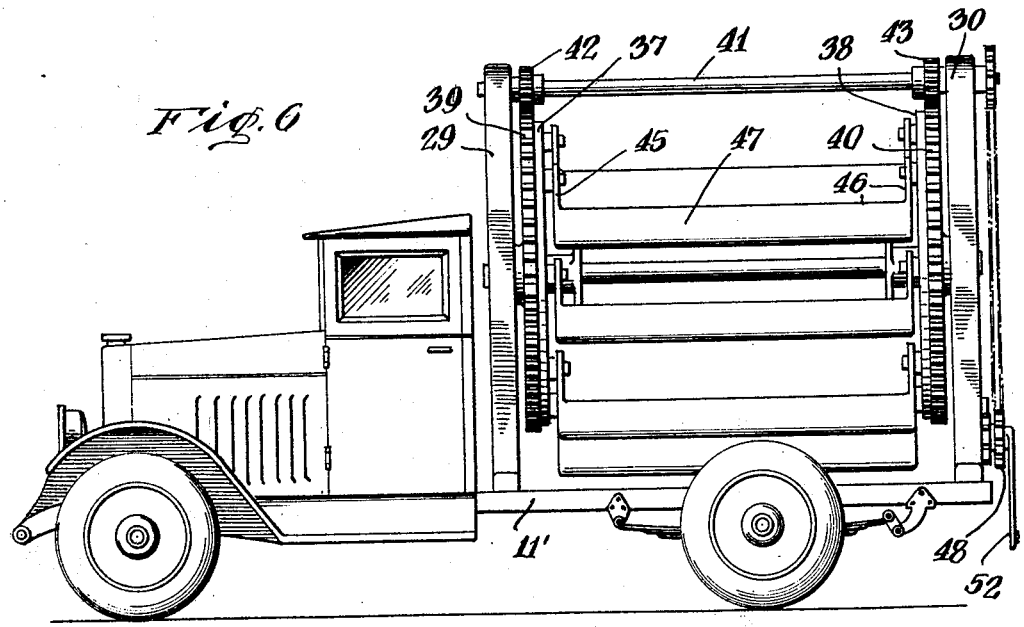
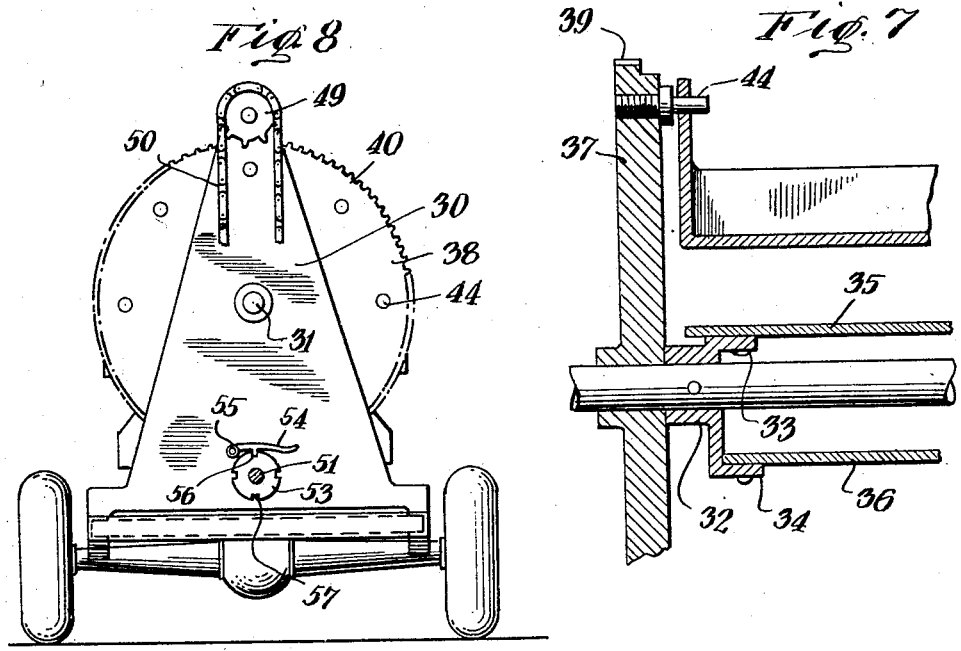
Inventor
Roy R. Schmidt
By his Attorney Patented Nov. 3, 1931

1,830,373

UNITED STATES PATENT OFFICE

ROY R. SCHMIDT, OF ELMHURST, NEW YORK

REVOLVING TRUCK LOADING STRUCTURE

Application filed February 6, 1929. Serial No. 337,855.

This invention relates to trucks and more particularly refers to improvements in trucks used for the transportation of bottled goods and other products which are likely to be of an assorted character, requiring proper selection for their delivery.

When an ordinary platform truck is used for the transportation and delivery of beverages and other bottled products which are generally packed in cases, the cases are generally placed on the platform one on top of the other; and unless great care is exercised in the loading this makes it difficult to reach those products which must be delivered first if they happen to have been loaded under or behind other products which have to be delivered at a later time.

Aside from the difficulty in loading and unloading when goods of the character specified are handled, it is also objectionable in practice to place one case on top of another, because bottle breakages due to this cause frequently occur.

Another factor which militates against the use of trucks of the ordinary type for the loading of bottled goods, is the relatively limited platform space available on the average truck.

On the other hand, practical considerations make it desirable to use a truck structure proper of the standard type, because a specially built chassis would necessarily result in a relatively high cost of production.

I have accordingly conceived and designed a special type of loading structure which may be placed directly on top of an ordinary truck chassis in place of the platform or body ordinarily used and which permits of ready separation and accessibility of different products so as to lighten and speed up the work attached to loading and delivering.

The primary object of this invention is to provide a novel type of truck consisting of a chassis of standard construction, and a superstructure mounted on said chassis, comprising a Ferris wheel assembly of loading crates or platforms rotatably mounted on a supporting frame; this arrangement permitting of any one crate or platform being readily brought to one side of the truck to loading or unloading position.

Another object is to provide in combination with a loading structure of the Ferris wheel type comprising a plurality of pivotally mounted loading crates or platforms, one or more stationary platforms permitting of utilizing the central space of the structure so as to increase the loading capacity of the truck onto which the structure is mounted.

A further object is to provide in a revolving truck loading structure of the character specified, means for operating the structure so as to readily bring the desired crate or platform to loading or unloading position, and means for locking the structure in any one of its angular operative positions.

Other objects and advantages of the present invention will more fully appear as the description proceeds and will be set forth and claimed in the appended claims.

Two possible embodiments of my invention are shown in the drawings in which:

Fig. 1 is a side elevation of a truck equipped with my improved type of revolving structure;

Fig. 2 is a cross sectional view of the same through line 2—2 of Fig. 1;

Fig. 3 is a rear elevation thereof;

Fig. 4 is a fragmentary longitudinal section through the central part of the structure;

Fig. 5 is a fragmentary cross section showing the use of rotating platforms in place of the crates shown in Fig. 2;

Fig. 6 is a side elevation of a truck equipped with another structure embodying my invention in a somewhat modified form;

Fig. 7 is a fragmentary longitudinal section through the central part of said structure; and Fig. 8 is a rear view in elevation of the truck with parts of the operating mechanism removed.

Referring to the arrangement illustrated in Figs. 1 to 5, 10 designates an ordinary motor, the chassis of which has a portion 11 extending rearwardly of the driver's cab 12.

At the front end of said rearwardly extending portion of the chassis is mounted a stand 13 and at the rear end is mounted a similar stand 14 connected thereto by a stationary shaft 15.

At each end of said shaft, in proximity of the stand but spaced therefrom is fixed a frame such as 16 having an inwardly extending upper lip 17 and an inwardly extending lower lip 18.

A stationary platform 19 is supported by and extends in a longitudinal direction between the two upper lips 17 and another wider platform 20 is similarly supported by and extends between the lower lips 18.

In the space intervening between each frame 16 and the adjoining stand, a disk member 21, 22, is rotatably mounted on shaft 15. Said disk members are connected to each other at circumferentially spaced intervals by rods 23 forming a rotatable cage structure therewith.

From each rod is pivotally suspended a crate such as shown at 24 extending for the entire length of the cage, forming a Ferris wheel structure therewith. When the cage structure is rotated around shaft 15, the loading crates 24 always remain in a vertical position due to the action of gravity, so that whenever a load is carried thereby, it will remain at all times supported by a horizontal surface. The height and width of the crates are such as to permit rotatory movement of the entire structure without interference between adjoining crates, as will be understood.

This type of structure affords many advantages particularly in connection with the handling of bottled goods. To begin with, the total loading surface of the crates is considerably greater than the surface of an ordinary platform, in spite of the fact that the width of the structure is much less than that of such a platform.

To this loading surface is added the surface of stationary platforms 19 and 20, which further increase the useful loading space and which permit of transporting a full load without placing cases one on top of the other.

Another and important advantage is that the various products can be separated by loading them in different crates and that any one of them can be made instantly accessible by turning around the cage structure until the desired crate has been brought besides the operator, who can then place cases on the same or remove them therefrom.

By virtue of this arrangement a practically automatic gradual displacement of one crate by another may be had when loading or unloading. In fact, assuming that all the crates are empty and that one of the crates such as 24' for instance, is in a convenient position for being loaded from the side of the truck, as soon as the load is placed on said crate the structure will become unbalanced and will rotate in a clockwise direction until crate 24' has reached the lowermost position; so that the next crate 24" will then be in position for loading.

As soon as said crate 24" is also loaded, the structure will again rotate in order to balance the load until the next crate is in position for loading and so on until half of the crates have been loaded. At this point, the angular displacement of the rotating structure necessary to bring the remaining crates within reach may be produced by hand, by the operator grasping the rods 23, the weight never being unbalanced enough to prevent this manual operation.

It is also possible to retain the rotating structure at any one of a number of angular positions, by providing the rear disk member 22 with a number of circumferentially spaced perforations 25 within which may be inserted a stop pin 26 projecting through a lug 27 formed integral with stand 14.

The stationary platforms 19, 20 can be reached from the sides through the space intervening between the body of each crate and its suspension rod 23, and the same can be used for placing cases of empty bottles or for placing those goods which may be needed last when making deliveries.

The individual load carried by each crate is relatively limited and therefore the entire structure may be made of a weight not exceeding that of an ordinary truck platform or body; so that the net load capacity of the truck is not decreased for the same gross load.

The loading elements may assume different forms according to the nature of the products to be handled; for instance, it is possible instead of crates to use flat platforms, such as shown at 28 in Fig. 5 in this case more space is made available for handling goods loaded or to be loaded upon the central stationary platforms.

The accessibility of the stationary platforms may be further increased by adopting an arrangement such as shown in Figs. 6 to 8 in which 11' designates the rearward extension of the truck chassis. Like in the previous case two stands 29, 30 are mounted upon a chassis one at the rear of the driver's cab and the other one at the rear end of the chassis.

A stationary shaft 31 extends between the two stands and like in the previous case, the same carries two frames such as 32 each provided with an inwardly directed upper lip 33 and an inwardly directed lower lip 34 on which are mounted longitudinal stationary platforms 35, 36, respectively.

Between each frame 32 and the adjoining stand, is rotatably mounted a disk member 37, 38, having a geared crown 39, 40. Another longitudinal shaft 41 is rotatably mounted on the stands, above the disk members, said shaft carrying pinions 42, 43 which are in mesh with geared crowns 39, 40 respectively. The rotation of shaft 41 will therefore cause disk members 37, 38 to rotate simultaneously at the same speed.

Each disk member is provided with a plurality of pins or studs 44 arranged along a circumference at evenly spaced intervals, said pins or studs projecting inwardly of said disk members and providing a pivotal suspension for the two end walls 45, 46 of each crate 47.

In this type of structure there are no rods such as 23 running for the entire length of the structure and therefore less difficulty will be experienced in reaching the load placed upon the central platforms.

The device may be operated in any suitable manner, for instance, by providing a rotatably mounted sprocket 48 at the lower end of the rear stand 30 and by connecting said sprocket to another sprocket 49 mounted on shaft 41 by means of a chain 50.

Sprocket 48 may be fixed on a shaft 51 which also carries a manually operable handle or lever 52 and a notched wheel 53. A manually operable pawl member 54 pivotally mounted at 55 on the stand 30 is provided with a lug 56 adapted to project within one of the notches 57 of wheel 53, so that said pawl member may be used to lock the entire structure at any desired angular position.

It will be observed that the loading surface of each crate or platform is always placed a certain distance from its pivotal point of support in order to permit the action of gravity to properly take place.

It is obvious that the construction of my device may be modified in its various details without departing from the inventive idea; the drawings will therefore be understood as being intended for illustrative purposes only and not in a limiting sense.

I accordingly reserve the right to carry my invention into practice in all those ways and manners which may enter, fairly, into the scope of the appended claims.

I claim:

1. A truck comprising a chassis, a front and a rear stand mounted on said chassis, a stationary shaft mounted on said stands, two end members rotatably mounted on said shaft, a plurality of circumferentially spaced loading units pivotally depending from and extending between said end members, means for locking said end members at various angular positions and means for simultaneously operating said end members.

2. A truck comprising a chassis, a front and a rear stand mounted on said chassis, two end members rotatably mounted upon said shaft, a plurality of circumferentially spaced loading units pivotally depending from and extending between said end members, a stationary loading unit fixed upon said shaft, extending between two said end members and means for simultaneously rotating said two end members.

3. A truck comprising a chassis, a front and a rear stand mounted on said chassis, a stationary shaft mounted on said stands, two end members rotatably mounted upon said shaft, a plurality of circumferentially spaced loading units pivotally depending from and extending between said end members, a stationary loading unit fixed upon said shaft extending between said two end members, means for locking said end members at various angular positions, and means for simultaneously rotating said two end members.

ROY R. SCHMIDT.